United States Patent [19]
Ladd et al.

[11] 3,874,222
[45] Apr. 1, 1975

[54] PIPELINE LEAK DETECTOR

[76] Inventors: Harry A. Ladd, P.O. Box 144, Indianola, Wash. 98342; Frederick L. Schenck, 302 W. Benjamin Holt Dr., Stockton, Calif. 95207

[22] Filed: July 23, 1973

[21] Appl. No.: 381,731

[52] U.S. Cl................ 73/40.5 R, 48/193, 340/242
[51] Int. Cl. ............................................ G01m 3/00
[58] Field of Search................ 73/40.5 R, 49.1, 40; 340/242; 324/52; 48/193

[56] References Cited
UNITED STATES PATENTS

| | | | |
|---|---|---|---|
| 3,280,620 | 10/1966 | Anderson | 73/40.5 R |
| 3,375,702 | 4/1968 | Birman | 73/40 |
| 3,510,762 | 5/1970 | Leslie | 324/52 |
| 3,531,264 | 9/1970 | Greipel | 73/40.5 R X |

FOREIGN PATENTS OR APPLICATIONS

| 601,298 | 5/1948 | United Kingdom | 340/242 |
|---|---|---|---|

*Primary Examiner*—Richard C. Queisser
*Assistant Examiner*—Joseph W. Roskos
*Attorney, Agent, or Firm*—Warren, Rubin & Chickering

[57] ABSTRACT

A leak detection and location system for a pipeline carrying a thermally unstable fluid is disclosed which includes an electric circuit along the pipeline with temperature sensitive elements spaced along the pipeline, each set to produce a unique signal in the circuit when a temperature characteristic of, or influenced by, leaking fluid is sensed and means to transmit that unique signal to an alarm. There is also disclosed a trough or canopy containing elements of the leak detection and location system, said trough to be buried with the pipeline in a position to collect leaking fluid.

11 Claims, 4 Drawing Figures

PIPELINE LEAK DETECTOR

BACKGROUND OF THE INVENTION

A pipeline is an excellent, economical and efficient way to transport bulk fluid material because tremendous volumes can be transported without burdening other transportation means such as highways and railroads and because pipelines can operate around the clock largely with automatic equipment and with few operating personnel. Long distances are traversed by pipeline through both remote regions and populated regions without extensive requirements for right of way or disruption of the area traversed in that pipelines are generally buried.

Many of the advantages of transportation by pipeline cause problems. For example, although some leaks may be found by observation, particularly small leaks in pipelines which are substantially unattended may not be noticed; or if a leak is detected, it may be difficult to find. In operating present-day pipelines, leaks are generally detected by material balance. When the amount of fluid metered out of a pipeline segment is less than the amount metered in, leakage accounts for most of the disappearance. Leaks detected by material balance are generally large leaks. For example, in a pipeline carrying 100,000 barrels per day, a metering system capable of detecting volume disappearance as small as 0.03% would detect a minimum leak of 30 barrels per day; and even if such a leak were detected in a remote area, several days might be required to locate it. Even small leaks of one or two barrels per day can be dangerous in populated areas.

Many pipelines carry what is designated herein as thermally unstable material. The term thermally unstable material is defined to mean material which, if released from the pipeline, would be at a temperature that is significantly different from the temperature of the material surrounding the pipeline. The simplest example of such a thermally unstable material is hot oil pumped through an insulated pipeline through an arctic climate wherein it is heated to keep the viscosity of the oil at a pumpable level. Oil leaking from such a pipeline would be hotter than the surrounding material, and it would be thermally unstable in that it would tend to be cooled to the temperature of the surrounding materials. Another example is liquified petroleum gas which, even though at the same temperature as the surroundings, upon being released from the pipeline and vaporizing would cause a substantial lowering in the temperature of the material surrounding the pipeline. For example, ethane under sufficient pressure to be liquid at 75°F if released to atmospheric pressure, would expand and cool to its boiling point of about −125°F. Leaks in pipelines carrying compressed gas would also cause a local cooling effect due to expansion of the gas, even without a change of phase.

THE INVENTION

The present invention provides a system for detecting small leaks and for locating the leak thus detected within close limits. The device of this invention is an electric circuit running the length of the pipeline to be monitored and including a plurality of spaced temperature sensing means located with respect to the pipeline in such a manner that temperature changes due to leaks are sensed. In this regard, the temperature sensing means must be spaced close enough together so that leaking material will not escape undetected and positioned with respect to the pipeline so that the temperature changing influence of the leaking material will be sensed by the temperature sensing means.

For example, if the pipeline is carrying a liquified gas, the temperature sensing means should be located in the trench and on or above the pipeline. If, as is preferred, a continuous canopy or trough is maintained above the pipeline to intercept escaping gas and channel it to a preselected escape point, a temperature sensing means at that preselected escape point is influenced by the temperature of the escaping gas, and the spacing between adjacent temperature sensing elements may be increased.

If the fluid in the pipeline is a liquid that tends to seep into the ground, then the temperature sensing elements and whatever troughs or canopies are used with them are located beneath the pipeline.

The temperature sensing elements are employed to actuate a signal producing means which introduces a unique signal for that temperature sensing means into the circuit when that temperature sensing means is actuated by a temperature influenced by leakage of the material from the pipeline. The unique signal is then transmitted to an alarm that indicates to operating personnel both that a leak exists and where the leak exists. The alarm normally will be located in a central monitoring station and it preferably, but not necessarily, will be both audible and visual. The signal also actuates the devices employed for locating the leak.

The temperature sensing means employed in the device of this invention may be any of those known to the art which are capable of sensing a temperature and either producing a signal or actuating a means to produce a signal responsive to the temperature that is sensed. Devices such as thermocouples, thermostatic switches, thermistors and the like are contemplated for use in the invention. When thermocouples are employed, the two junctions must be sufficiently separated so that a leak of thermally unstable fluid will not affect both in the same way. If the thermally unstable fluid will cause a lowering of temperature, the cold junction should be placed to intercept the flow of leaking fluid while the hot junction should be positioned remote from the escape route of leaking fluid. A thermocouple senses a leak by a temperature difference between junctions indicating that one junction is at a temperature not characteristic of the material surrounding the pipeline, and a thermocouple accordingly is not influenced by seasonal or diurnal temperature fluctuations.

When a thermostatic switch is employed as the temperature sensing means, it must be one that is set to close a circuit at a temperature that is characteristic of escaping fluid from the pipeline but one that would never normally be encountered in the ground surrounding the pipeline. For example, pipelines carrying liquified gases could be monitored by thermostatic switches set to close a circuit at a temperature of 0°C, one which would never be encountered around a buried, operating pipeline as a result of natural weather or climate conditions. A thermostatic switch set to close between 1°C and 3°C will effectively monitor for leaks in a liquified gas pipeline without encountering the thermal insulating effect of frozen ground water.

A thermistor, like a thermostatic switch, effectively causes a circuit to close when a particular temperature is reached. When a thermistor is employed as the temperature sensing element in this invention, it will be employed in the manner described above for a thermostatic switch. Thermistors are preferred over thermostatic switches because they are much more reliable in an environment such as being buried in the ground in that their operation does not depend upon mechanical moving parts but only upon the temperature to which the resisting material is subjected.

The means for producing a unique signal that is employed in the present invention may be a single means or a combination of means. The purpose of the unique signal is to indicate to personnel in a central monitoring station which of the temperature sensing means is sensing a temperature characteristic of leaking fluid thereby indicating the location of the leak. The temperature sensing means may actuate a device that produces a unique signal, such as a DC or an AC current of a unique frequency or with a unique wave form that could be transmitted over the circuit associated with the pipeline and analyzed at the reception point to identify which of the temperature sensing means is causing the signal to be sent. It is preferred however that the temperature sensing means act in cooperation with the transmission circuit to produce a unique signal. This can be done, for example, by employing the temperature sensing means with a switch device in a manner such that when a temperature influenced by leaking fluid is sensed, the switch device will short out a circuit running the length of the pipeline that is being monitored.

For example, if a given length of pipeline is being monitored and a circuit of known resistance is maintained, placing all of the temperature sensing means and signal producing means in parallel in that circuit will produce a unique resistance in the circuit for each of the temperature sensing means. In this instance the means for producing a unique signal is the combination of the signal producing means and the circuit itself which has a known incremental resistance or known resistance as a function of length, and the unique signal produced is a measure of the current flow or voltage drop characteristic of the number of increments between the control station and the actuated temperature sensing means.

Although some of the above-mentioned temperature sensing means could be employed themselves to produce a short across the monitoring circuit, it is preferred that these devices actuate a switch means which shorts out the circuit or actuates a different unique signal producing means. A typical signal producing means and the preferred one of this invention is s silicon controlled rectifier which has extremely high resistance but becomes almost fully conductive when a small control impulse actuates it. Silicon controlled rectifiers are preferably employed because they can hold off high voltages for long periods of time and carry significant currents when in the full conductance condition.

The invention includes a trough specially adapted for use with the leak detection system.

DETAILED DESCRIPTION OF THE INVENTION

The accompanying drawings are presented to explain the invention better by describing in detail specific embodiments of it.

Figure 1:
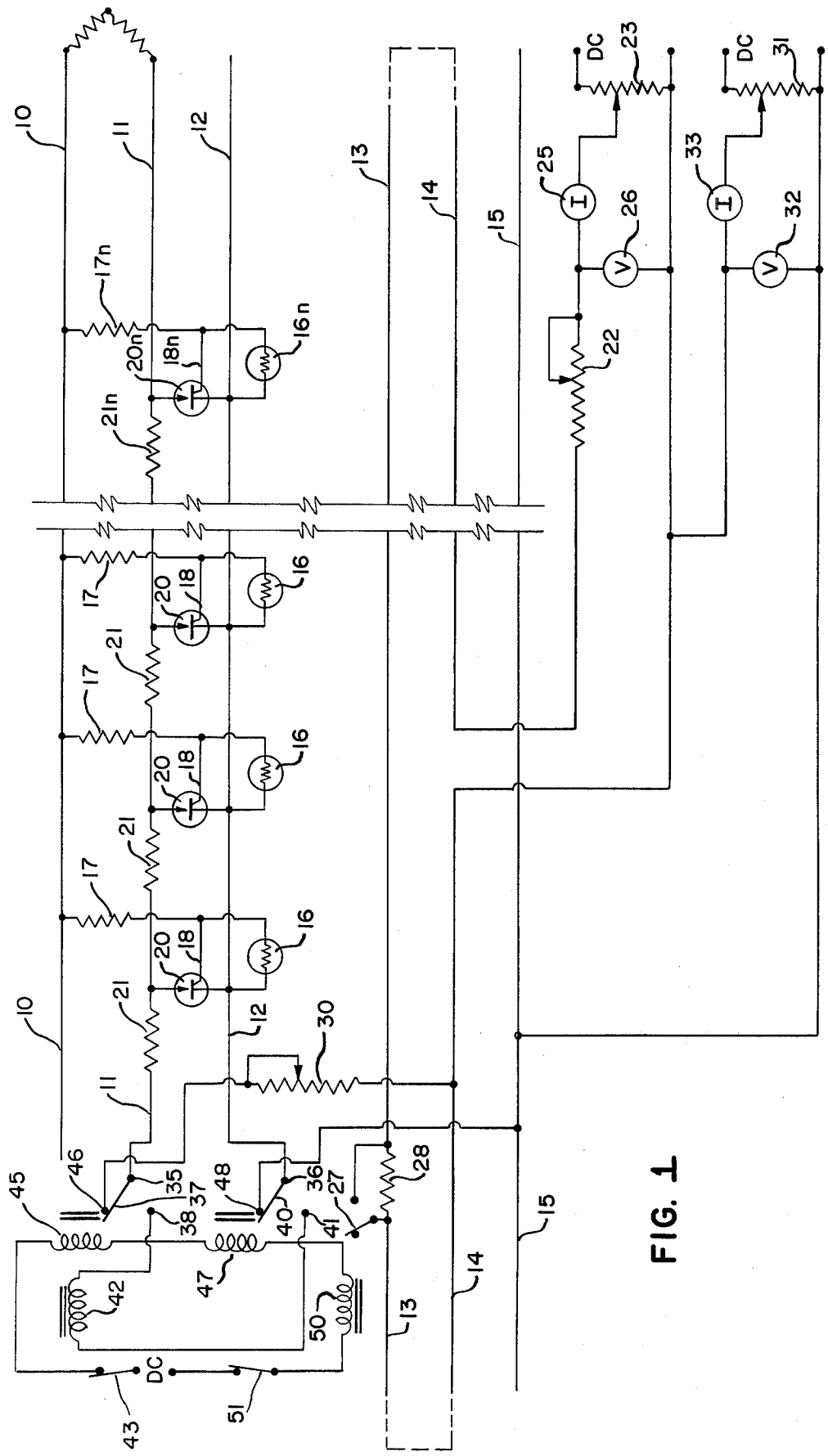
FIG. 1 is a schematic diagram of a segment of a device embodying this invention.

FIG. 1 illustrates a particularly desirable embodiment of the present invention wherein a six-wire cable is disposed along a pipeline and arranged to both detect and locate leaks. The six wires in the cable are illustrated in FIG. 1 by numbers 10 through 15 respectively. Wires 10, 11 and 12 are detector wires while wires 13, 14 and 15 are signal conductors.

Wires 10, 11 and 12, although running the entire length of the detector circuit, are arranged to be in detector segments with each segment monitoring some convenient length of pipeline, for example, approximately 6000 ft. In general, any leak in the portion of the pipeline monitored by a monitoring segment will produce a signal in the signal wires that indicates that a leak exists as well as the location of the leak.

In the embodiment shown, a convenient voltage is maintained between wires 10 and 11 on the one hand and wire 12 on the other. A voltage such as 165 volts D.C. is convenient and will be employed for purposes of illustration. Wires 10 and 11 are each maintained at positive voltage while wire 12 is maintained at negative voltage. A thermistor 16 is maintained between each wire 12 and the gate 18 of each silicon controlled rectifier 20, and a resistor 17 is maintained between each wire 10 and the gate 18 of each silicon controlled rectifier 20. As discussed heretofore, a thermistor is a temperature sensing device that has variable resistance with temperature which changes over a specific temperature range. At higher temperatures, the resistance of a thermistor is lower. Each thermistor 16 always is conductive to some extent and is in parallel with gate 18 of silicon controlled rectifier 20. Since thermistor 16 is more conductive at high temperature, under normal operating conditions it shunts current away from gate 18 so that rectifier 20 will not fire, i.e., become conductive. However, as the temperature of thermistor 16 diminishes, e.g., due to leakage of liquified gas, its resistance increases and more current is carried through gate 18 until eventually the silicon controlled rectifier 20 fires and creates the effect of a dead short between lines 11 and 12.

In this regard, line 10, although part of the detector circuit, actually does not literally participate in detection of a leak. Its primary function is to provide uniform gate bias conditions for the full length of the segment. It may also be noted that the temperature at which rectifier 20 fires is adjusted by the relationship between resistor 17 and thermistor 16. If it is desired to signal a leak by detecting a too-high temperature aberration, the circuit can be modified by reversing the positions of resistor 17 and thermistor 16. In either case, the signals to detect leaks and the signals to indicate their locations are carried through lines 11 and 12.

The detector segment illustrated may have any number of thermistors 16 with the associated signal producing means such as silicon controlled rectifiers 20. The thermistors will be spaced along the pipeline close enough together to detect any leak by sensing a temperature aberration due to the thermally unstable fluid being released from the pipeline. For purposes of illustration, a distance of 8 feet apart will be employed. Thus, a thermistor will be a maximum of 4 feet from any leak; and, particularly when themistors are employed with troughs to be described in more detail hereinafter, substantially any leak should be detectible.

Wire 11 contains a resistor 21 associated with each silicon controlled rectifier 20. The resistors 21 have known resistance so that the electrical characteristics of a circuit that includes wire 11 read at a monitoring station will indicate how many resistances 21 are in series and, accoridngly, which rectifiers 20 are conductive thereby indicating where the leak is located.

The detector circuit thus far described is buried with the pipeline and in close proximity to it. At both the upstream and downstream end of each detector segment a tie-in with the signal wires is effected. This will generally, although not necessarily, be accomplished in a surface station which may be pumphouse or other structure or simply a weather-resistant box suitably mounted and protected. When a circuit is closed between wires 11 and 12, means in the surface station such as solenoids function to operate at least three switches. These switches tie lines 11 and 12 into the signal circuit and indicate to a central monitoring station which segment is sensing a temperature aberration, as will be described more fully hereinafter.

The signal wires 13, 14 and 15 conduct signals from the detector wires 11 and 12 to a central monitoring point. At the central monitoring point, the loop comprising wires 13 and 14 may be adjusted with a specific voltage and current while a circuit comprising wires 14 and 15 may also be adjusted with a specific voltage and current. As will be discussed hereinafter, these adjustments are employed to detect and locate leaks.

In the central control point, a variable resistor 22 is adjusted to give a predetermined resistance around the loop including wires 13 and 14. For purposes of illustration, this resistance will be assumed as 2500 ohms. Since establishing the resistance of the loop including wires 13 and 14 is the only function of variable resistor 22, it may be locked in position. The variable potentiometer 23 may then be adjusted so that exactly 400 microamps are indicated at ammeter 25 and exactly 1.000 volts are indicated on voltmeter 26. These measurements are made with the switch 27 and its counterparts closed so that the resistance 28 and its counterparts are bypassed. Conveniently, each surface stateion or tie-in point to the signal wires 13, 14 and 15 is assigned a station number, and conveniently the resistance in ohms of resistor 28 is an even multiple of the station number. For example, if the illustration of FIG. 1 is station number 52 and the segment associated with it, conveniently resistor 28 would have a resistance of 25 × 52 or 1300 ohms. The remaining elements of the control station will be explained in the following description of how the detecting and locating system operates.

It is generally not feasible to space surface stations exactly the same distance apart. However, it is desirable that the voltage measured at the central monitoring station be equivalent to the distance between surface stations. For example, if the distance between surface station 51 and 52 is 5370 feet, it will be desirable to adjust that particular detector segment so that the voltage across it will be 0.5370 volts if voltage is to be equivalent to distance. This can be done by first makking a loop of wires 11 and 12 and measuring the resistance of the loop. From this measurement, the resistance of the detector circuit with all resistors 21 can be determined. For example, if the resistance of the circuit of wires 11 and 12 is 14,767 ohms, dividing 0.5370 by 14,767 indicates that a current of 36.4 microamps should flow in the circuit to make voltage drop equivalent to distance. The variable resistor 30 at the surface station and variable potentiometer 31 at the monitoring station are manipulated until voltmeter 32 indicates exactly 1.000 volts when ammeter 33 indicates 36.4 microamps when points 35 and 36 are shorted. At that point, variable resistor 30 may be locked in position and not adjusted again as long as no changes in the wiring of the segment are made.

For purposes of illustration, assume that a leak occurs in a pipeline carrying liquified gas at a position monitored by thermistor 16$n$. The designation $n$ after a reference number indicates that the element so identified is associated with the $n$th thermistor where the leak is. The cooling effect of leaking fluid increases the resistance of thermistor 16$n$ to fire silicon controlled rectifier 20$n$, thereby closing the circuit between wires 11 and 12. With the circuit closed, only the resistors 21 between the surface station and resistor 21$n$ are in the circuit; and, as a result, the current flow through line 11 increases.

FIG. 1 illustrates the system in a condition where there is a leak and a signal is being sent. With no signal, switch 37 connects point 35 to point 38, and switch 40 connects point 36 to point 41. In these positions of switches 37 and 40, solenoid 42 is in circuit with lines 11 and 12, and when the current flow increases due to a leak, switch 43 closes which in turn actuates solenoid 45 to move switch 37 into contact with point 46, actuates solenoid 47 to move switch 40 into contact with point 48 and actuates solenoid 50 to open switch 27 whereby resistor 28 is put in the loop including wires 13 and 14. Switch 51 is a manual switch used to control the circuit including solenoids 45, 47 and 50. This circuit has its own power supply. In the condition illustrated, i.e., when a leak is detected, switch 37 connects wire 11 to point 46 and the loop including wires 13 and 14; and switch 40 connects wire 12 to point 48 and the circuit including wire 15.

When switch 27 opens, a resistance of 1300 ohms is placed in the loop including wires 13 and 14, and, as a result, the current sensed in ammeter 25 diminishes substantially. The drop in current may also actuate alarm means such as sirens, blinking lights or the like, or the current arising in the loop including wires 14 and 15 may be used for this purpose.

At the central monitoring point an operator alerted by the alarm operates variable potentiometer 23 to return the current indicated at ammeter 25 to exactly 400 microamps. This operation may be done either manually or automatically. The operator will then read the voltage on voltmeter 26 as 1.520 volts because resistor 28 is in the loop, as explained hereinabove, whereby he knows that the signal indicating a leak originated in the detecting segment terminating at station 52.

The voltmeter 26, of course, may be calibrated to read the surface station number directly. When the operator knows that station 52 is reporting a leak, he can consult a chart or other record and determine that a current of 36.4 microamps is the one required in ammeter 33 to make voltage on voltmeter 32 equivalent to distance in feet between station 51 and station 52. Accordingly, the operator adjusts variable potentiometer 31, and a reading appears on voltmeter 32, e.g., 1.4763 volts, which indicates that the resistance of the portion of wire 11 between the leak and the surface station 52 in the circuit is equivalent to 4,763 feet of wire loop 11 and 12. In other words, the leak detected in station 52 is 4,763 feet from station 52 toward station 51. Again, voltmeter 32 can be calibrated to read directly in feet.

A crew dispatched to repair the leak can locate it readily through the combined use of the disclosed embodiment and methods known to the art for locating a leak known to exist in the limited area.

Figure 2:
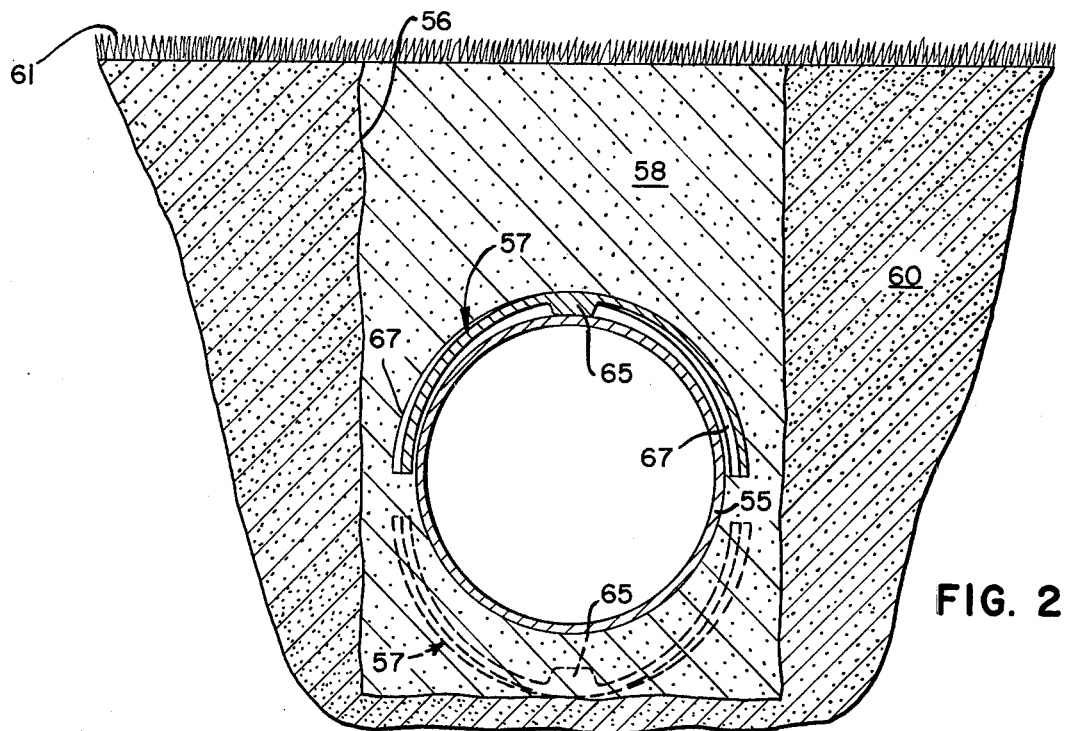
FIG. 2 is a partial sectional view illustrating a device embodying this invention positioned with respect to a pipeline.

FIG. 2 illustrates the manner in which the present invention is used. In FIG. 2 a pipeline designated 55 and carrying a thermally unstable fluid is buried in a trench 56 with a trough 57 positioned above it to intercept leaking liquified gas. In this description,, the word trough is used to describe an element designed to intercept the flow of escaping fluid whether oriented to be concave upward or downward. If the fluid is a liquid which would normally collect in the bottom of the trench 56, the trough 57 would be positioned slightly below the pipeline 55 as illustrated in broken lines so that it would be surrounded with dirt and not support the weight of the pipeline. The pipeline is then covered with backfill 58 so that generally the trench containing the pipeline is indistinguishable from the surrounding earth 60. It is contemplated that normal vegetation 61 will grow above the buried pipeline 55 in a manner similar to where it grows above the normal earth 60. If a liquified gas in pipeline 55 leaks from pipeline 55, it will tend to rise toward the surface of the earth, and it will be intercepted by trough 57. Trough 57, as will be discussed in greater detail hereafter, directs the escaping gas along a path where it will intercept a temperature sensing means which in turn will cause a signal indicating that a leak exists and indicating its location.

Figure 3:
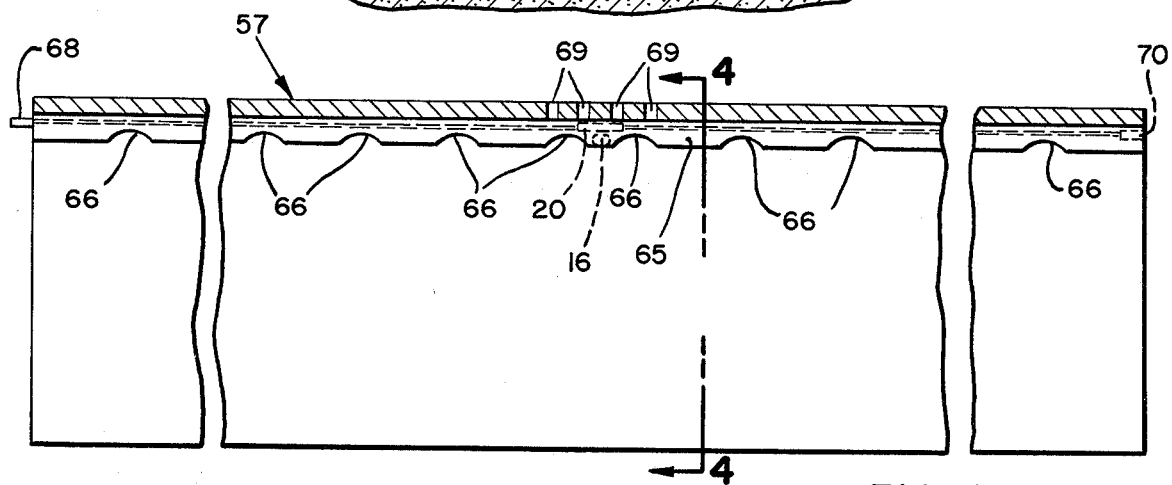
FIG. 3 is a partial plan view of a trough embodying the present invention.
Figure 4:
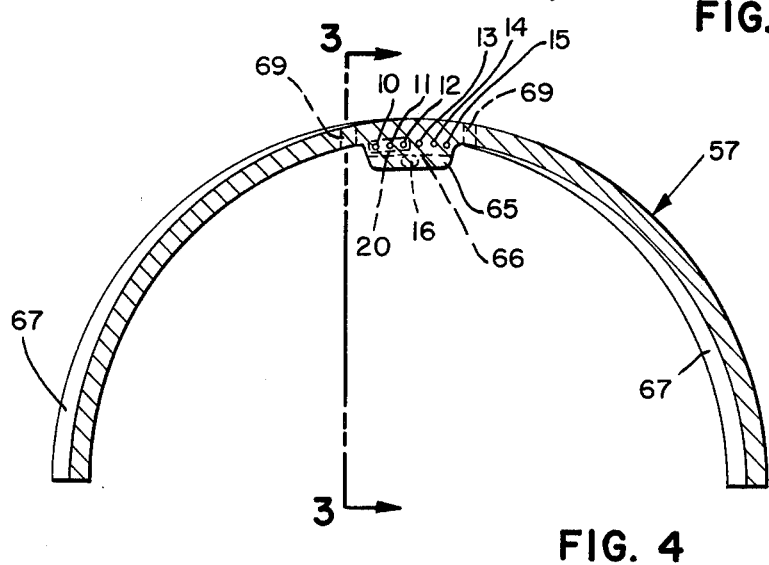
FIG. 4 is a sectional view taken along the line 4—4 of FIG. 3.

FIGS. 3 and 4 illustrate an embodiment of the trough 57 in greater detail. A trough preferably is a flexible member that is elongated in one direction and arcuate in cross section. Preferably, the trough is constructed with wires 10, 11, 12, 13, 14 and 15 embedded in it, and the trough is contained on a spool so that it may be unrolled much as a cable is unrolled as it is installed or made in convenient lengths which are fastened together as the trough is installed. These methods of preparing the trough are inexpensive in that all elements of the leak detection system are in a single piece as well as efficient in that only the trough need be laid in the trench rather than the trough and the cable separately. The problem of cable slack which will cause the length of cable and the length of pipeline to differ is avoided by this construction.

FIGS. 3 and 4 illustrate a preferred embodiment of the trough of this invention. The trough 57 is semielliptical in shape and provided with a central protuberance 65 which runs the length of the trough and contains wires 10-15 running its length as well as at least one thermistor 16 and at least one silicon controlled rectifier 20 embedded at appropriate points and internally wired to wires 10, 11 and 12. The illustrated embodiment shows a length, e.g., eight feet, which requires only one thermistor per length.

In order to insure good circulation of leaking fluid, the protuberance 65 is provided with a number of cross channels 66 and the trough is provided with vent holes 69 near the thermistor 16. Additionally, the trough is constructed to be held away from the side of the pipeline to avoid sealing against its side and thereby failing to collect gases leaking from the underside of the pipeline and passing upwardly around its circumference. Means to accomplish this may include internal bosses or, as illustrated in FIG. 4, a corrugated side wall having circumferential undulations 67.

Adjacent sections of trough may be connected to each other by suitable plugs 68 that are received in sockets 70. Such connections may be sealed with protective coatings known to the art.

The six wire system described hereinabove is inherently capable of detecting and locating multiple leaks. Although it is almost inconceivable for a modern pipeline to have multiple leaks commencing simultaneously, if leaks are detected commencing in two locations at the same time, the signals for detection and location of the leaks can be dealt with algebraically to resolve the superimposed signals into their components.

Although this invention has been described in reference to a pipeline, it is capable of being used to detect and locate leaks in other containers for thermally unstable fluids, such as tanks, reservoirs and the like. The invention may be employed to monitor a complete pipeline even if it is hundreds of miles long, or it may be used discontinuously to monitor only critical segments of a pipeline.

What is claimed is:

1. A device for detecting and locating leaks in an elongated conduit carrying a thermally unstable fluid comprising:
    A. a plurality of detecting circuits each comprising at least two detecting wires having spaced temperature sensing means in parallel between said wires which actuate means to close a circuit when a temperature influenced by escaping fluid is sensed,
    B. means associated with each temperature sensing means for producing a signal in said detecting wires unique to that temperature sensing means,
    C. a signal carrying circuit connectible to all detecting circuits along said conduit and terminating in a monitoring station,
    D. means for transferring a signal indicating a leak from each detecting circuit into said signal carrying circuit, and
    E. means in said monitoring station to identify said unique signal.

2. The device of claim 1 wherein said detecting circuit comprises three wires, the first and second of said wires with a potential difference between them interconnected by a resistor and a thermistor set to be characteristically conductive at a temperature influenced by the escape of said thermally unstable fluid, the flow of current through said thermistor causing a silicon controlled rectifier between one of said first and second wires and the third wire to be conductive, and the third wire having a resistor of predetermined resistance associated with each thermistor.

3. The device of claim 1 wherein said signal carrying circuit comprises three wires, the first and second of said wires forming a loop including a by-passed, predetermined resistance associated with each detecting circuit and with means to place said resistance in the loop when a signal indicating a leak in that detecting circuit is introduced into the loop, means in said monitoring station to identify the specific resistance in said loop and thereby the detecting circuit signaling a leak, means responsive to a signal indicating a leak for placing the unique signal from the detecting circuit into a loop including the third wire of said signal carrying circuit and the third wire of the detecting circuit, and means in said monitoring station for identifying the unique signal with the temperature sensing means that senses a temperature influenced by release of thermally unstable fluid.

4. A trough comprising an elongated, flexible sheet having arcuate cross section with at least one opening in a central portion thereof, said trough having embedded therein a plurality of electric wires running parallel to the long axis of the trough with at least two of said wires connected through a temperature sensing means to be shorted at a preselected temperature, and with said temperature sensing means being positioned to sense the temperature of fluid passing through said opening.

5. The trough of claim 4 wherein six conductors are embedded in said trough.

6. The trough of claim 4 wherein said wires and said temperature sensing means are embedded in a central protuberance extending from the center of the concave surface of said trough.

7. The trough of claim 6 wherein said protuberance includes cross channels perpendicular to the axis thereof.

8. The trough of claim 4 including vent holes positioned to permit the escape of fluid adjacent to said temperature sensing means.

9. The trough of claim 4 including means for holding said trough from the side of a pipeline.

10. The trough of claim 9 wherein said means are circumferential corrugations.

11. In combination with a buried pipeline containing thermally unstable fluid, the improvement which comprises a buried trough positioned with respect to said pipeline to intercept fluid escaping therefrom, said trough comprising an elongated, flexible sheet having arcuate cross section and a series of longitudinally spaced openings in a central portion thereof and having embedded therein a plurality of electric conductors running parallel to the long axis with at least two of said conductors connected through a temperature sensing means positioned to sense the temperature of fluid passing through an opening and adapted to close a circuit between said two of the conductors when a temperature aberration is sensed, and means associated with said circuit to produce a unique signal in said conductors.

* * * * *

UNITED STATES PATENT OFFICE
CERTIFICATE OF CORRECTION

PATENT NO. : 3,874,222
DATED : April 1, 1975
INVENTOR(S) : Harry H. Ladd and Frederick L. Schenck It is certified that error appears in the above-identified patent and that said Letters Patent are hereby corrected as shown below:

Title page, item 76, change "Harry A. Ladd" to ---Harry H. Ladd---;

Column 3, line 52, after "of this invention is" change "s" to ---a---;

Column 5, line 47, change "stateion" to ---station---.

Signed and Sealed this sixth Day of April 1976

[SEAL]

Attest:

RUTH C. MASON
Attesting Officer

C. MARSHALL DANN
Commissioner of Patents and Trademarks